INVENTOR.
VICTOR DiDONATO

Aug. 18, 1970 V. J. DI DONATO 3,525,085
MAGNETIC CORE MEMORY
Filed Nov. 29, 1965 3 Sheets-Sheet 2

INVENTOR.
VICTOR DiDONATO

MAGNETIC CORE MEMORY

Filed Nov. 29, 1965 3 Sheets-Sheet 3

INVENTOR.
VICTOR DiDONATO

United States Patent Office 3,525,085

Patented Aug. 18, 1970

3,525,085

MAGNETIC CORE MEMORY

Victor J. di Donato, Santa Monica, Calif., assignor to Electronic Memories, Incorporated, Hawthorne, Calif., a corporation of California Filed Nov. 29, 1965, Ser. No. 510,171
Int. Cl. G11c *5/04, 11/06*
U.S. Cl. 340—174 4 Claims

ABSTRACT OF THE DISCLOSURE

A magnetic core assembly employing a plurality of stacked aperture plates for orienting and retaining magnetic cores. Each plate has a plurality of slots therein with each slot having substantially straight side walls extending between the top and bottom plate surfaces. The slots are arranged in a matrix of rows and columns with each slot being oriented at a substantially 45° angle with respect to said rows and columns. Each of the plates has a plurality of column channels formed therein, each intersecting each of the matrix rows for receiving a column conductor. Similiarly, the plates each have a plurality of row conductors formed therein, each intersecting each of the matrix columns for receiving a row conductor. The plates are so oriented that the slots of adjacent plates are misaligned to thus enable the top surface of each plate to support the cores in the plate above it.

This invention relates generally to improvements in magnetic core memory fabrication methods and apparatus.

Magnetic cores, comprising small doughnut-shaped elements, are used in great quantities in data processing equipment for storing digital information. The cores, which may have as small as a ten mil diameter, are usually arranged in a rectangular matrix consisting of rows and columns to form a memory array. Cores in a single row or column are usually threaded by a common conductor. It will be readily appreciated that because of the small size of the cores, they are very difficult to handle and thread. Although many attempts have been made to provide automatic handling apparatus for performing these tasks, such apparatus has for the most part been unsuccessful. Consequently, almost all core memories are still manually threaded. In order to facilitate such manual threading, some type of aperture plate is usually provided defining a rectangular matrix of core pockets each adapted to orient and retain one of the cores. In use, a quantity of cores is deposited on the plate and the cores are either brushed or vibrated into the pockets with the assistance of a vacuum usually created on the underside of the plate.

Prior art aperture plates have generally been formed by chemically etching the pockets in a metal sheet. As core sizes are reduced however, it has become increasingly difficult to accurately fabricate aperture plates employing prior art techniques inasmuch as it is extremely difficult to maintain close tolerances by chemical etching. In view of this, it is an object of the present invention to provide an improved aperture plate for holding magnetic cores together with a method of fabricating such a plate.

It is a still further object of the invention to provide aperture plates which can be used for retaining magnetic cores while they are being threaded, which plates can also ultimately form part of an assembled core stack.

Briefly, in accordance with one aspect of the present invention, an aperture plate is fabricated out of a plastic or some other moldable material by forming it between first and second mold surfaces having oppositely directed teeth. The teeth form pockets or slots in the plate in which the cores are later deposited. After molding, the top and bottom surfaces of the plate are removed, as by machining, so that each slot then extends all the way through the plate. Orthogonal channels intersecting the slots are then machined in the plate to facilitate the threading of cores deposited in the slots. A plate so fabricated can then be used to form another mold, as by electroforming, which latter mold can include means defining the channels. Plastic aperture plates inexpensive enough to form part of an assembled core stack can be formed from this latter mold.

The novel features that are considered characteristic of this invention are set forth with particularity in the appended claims. The invention itself will best be understood from the following description when read in connection with the accompanying drawings, in which:

Figure 1:
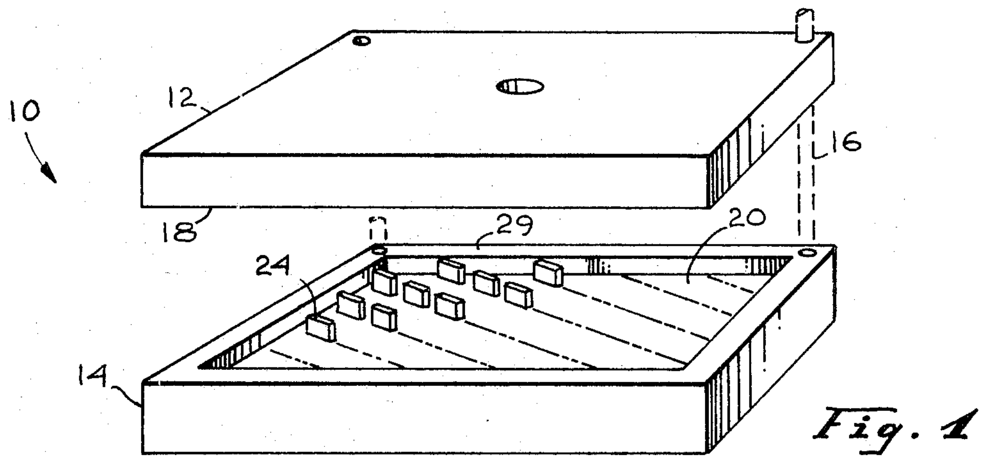
FIG. 1 is a perspective view of a molding apparatus, illustrated in an open position, employed in accordance with the invention.

Attention is now called to FIG. 1 of the drawings which illustrates a molding apparatus 10 which can be used to initially form an aperture plate in accordance with the invention. The molding apparatus 10 includes first and second molding plates 12 and 14 which are coupled to move relatively toward and away from one another. For example, the plate 14 can be considered as being fixed and having guide rods 16 extending therefrom. The rods 16 extend through holes in the plate 12 which can thus move on the rods 16 toward and away from plate 14. The plates 12 and 14 respectively have molding surfaces 18 and 20 from which rectangular teeth project vertically. The teeth are usually arranged in a rectangular matrix of rows and columns. Although the teeth on each plate can be oriented in any desired pattern, it will be assumed herein that all of the teeth are oriented at substantially a 45° angle with respect to the rows and columns.

Figure 2:
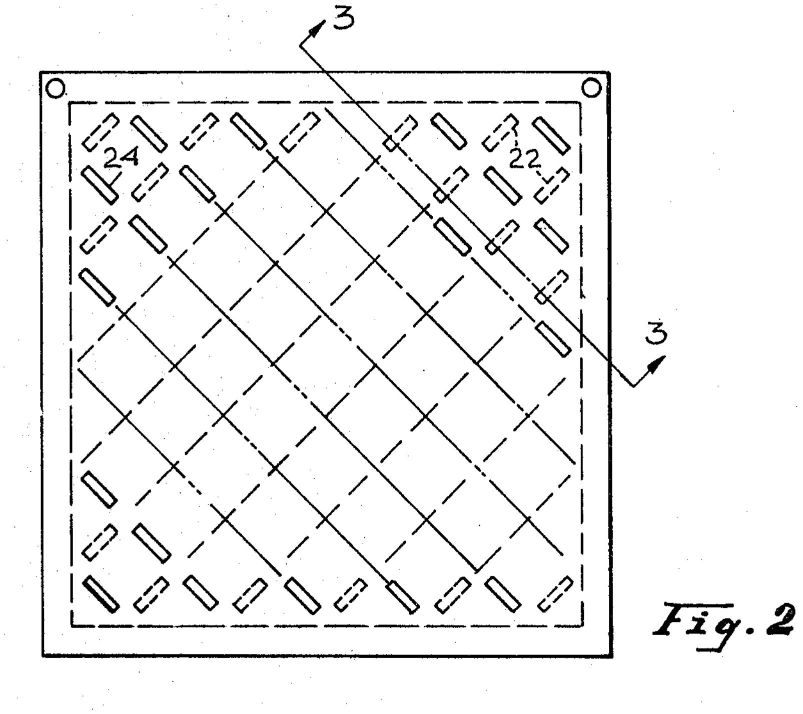
FIG. 2 is a diagrammatic plan view of the molding apparatus of FIG. 1 illustrated in a closed condition.

As shown in FIG. 2, the teeth 22 on the plate 12 are oriented oppositely relative to the teeth 24 on the plate 14 when the plates are superposed. It should also be noted that the teeth 24 are offset from the teeth 22 so that when the molding apparatus 10 is closed, the teeth 22 and 24 are interleaved as shown in FIG. 2.

Figure 3:
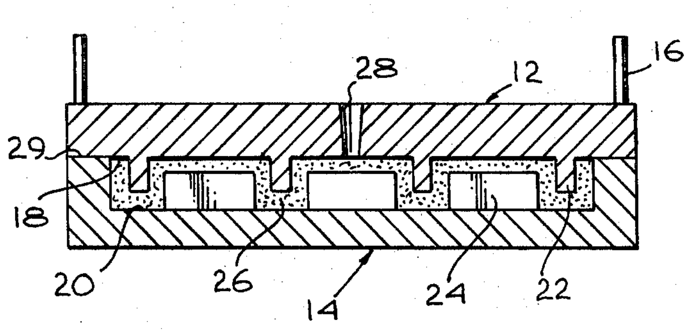
FIG. 3 is a sectional view taken substantially along the plane 3—3 of FIG. 2 illustrating a plate being molded in the apparatus of FIGS. 1 and 2.
Figure 5:
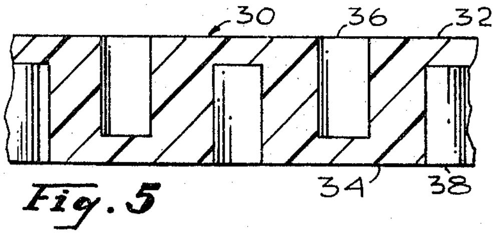
FIG. 5 is a sectional view taken substantially along the plane 5—5 of FIG. 4.

A moldable material 26 such as plastic is deposited between the molding surfaces 18 and 20 through a central passageway 28 in the plate 12 as shown in FIG. 3. The material 26 is retained between the molding surfaces 18 and 20 by the frame 29 forming part of the plate 14. The material 26 is then set, as for example by the application of appropriate heat and pressure, to form a block 30 as shown in FIG. 5 having top and bottom surfaces 32 and 34. Apertures or slots 36, defined by the teeth 22 projecting from the molding surface 18, extend into the block 30 from the surface 32. Similarly, slots 38, defined by the teeth 24 extending from the molding surface 20, extend into the block 30 from the surface 34.

Figure 7:
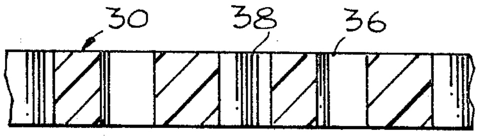
FIG. 7 is a sectional view taken substantially along the plane 7—7 of FIG. 6.
Figure 4:
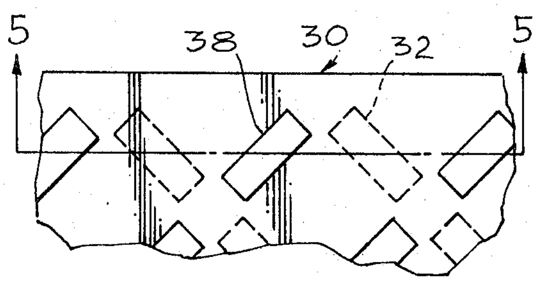
FIG. 4 is a plan view of a portion of the molded plate.
Figure 6:
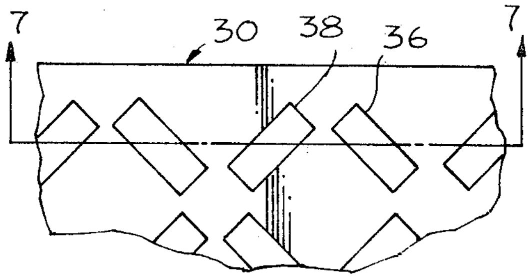
FIG. 6 is a plan view of the plate of FIGS. 4 and 5 after portions of the top and bottom surfaces thereof have been removed.

In accordance with the fabrication method of the present invention, the top and bottom surfaces 32 and 34 of the block 30 (FIGS. 5 and 6) are machined, as by milling or grinding, to remove sufficient material therefrom so that the slots 36 and 38 extend all the way therethrough as shown in FIGS. 6 and 7.

Figure 8:
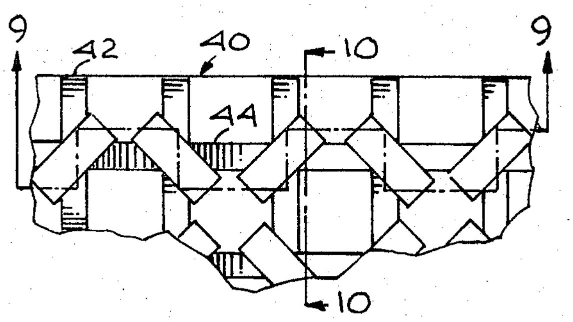
FIG. 8 is a plan view of the plate of FIG. 6 illustrating the orthogonal channels formed therein.

The block 30 of FIGS. 6 and 7 is then further machined to form the aperture plate 40 of FIG. 8 by forming orthogonal channels 42 and 44 therein. More particularly, a plurality of parallel column channels 42 is formed in the top surface 46 of plate 40 as by grinding. Each of the channels 42 is aligned with one column of slots and intersects all of the slots thereof. The plurality of row channels 44 is similarly formed and also extends into the plate 40 from the top surface 46 thereof. Each of the plurality of parallel channels 44 is aligned with one of the rows of slots and intersects the slots thereof. It should be noted that the intersecting channels 42 and 44 extend to different depths into the plate 40. Since these channels are provided to receive conductors being threaded through cores deposited in the slots, making them of different depths assures that conductors carried in the bottom of the channels will cross over one another rather than actually intersect one another.

Figure 9:
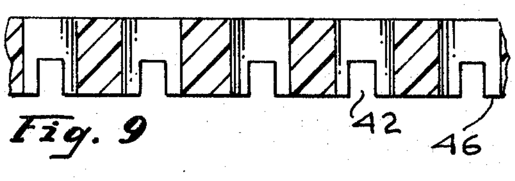
FIG. 9 is a sectional view taken substantially along the plane 9—9 of FIG. 8.
Figure 10:
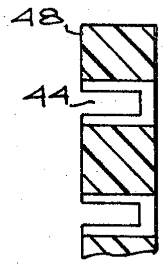
FIG. 10 is a sectional view taken substantially along the plane 10—10 of FIG. 8.

The aperture plate 40 of FIGS. 8–10 can be used to facilitate the stringing of a core array by initially causing a single core to be deposited into each slot thereof. This is most easily done by depositing a large quantity of cores on the top surface of the aperture plate and then vibrating the plate while creating a vacuum on the undersurface thereof. In order to prevent cores from falling through the slots in the aperture plate 40, a support plate (not shown) having vacuum passing holes therein aligned with the slots in aperture plate 40 can be placed beneath plate 40. With a single core in each slot, a needle can be inserted through each row and column channel to pull a conductor through the cores thereof. The ends of the conductors can then be physically and electrically connected to a core frame. The aperture plate can then be removed, leaving a core matrix suspended on the conductors carried by the core frame.

Although the aperture plate 40 of FIGS. 8 through 10 is reasonably inexpensive to fabricate by the foregoing technique, further significant economies can be introduced once an initial aperture plate has been formed. More particularly, the most significant costs involved in fabricating the aperture plate of FIGS. 8–10 are attributable to the machining required to form the channels 42 and 44 therein. In order to avoid this machining, a mold can be formed by a suitable electroforming process from the aperture plate of FIGS. 8–10.

Figure 12:
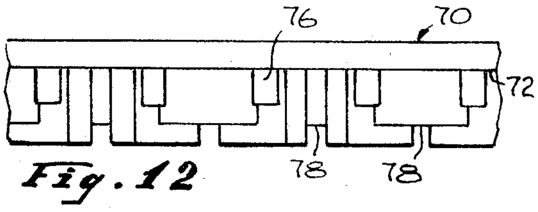
FIG. 12 is a sectional view taken substantially along the plane 12—12 of FIG. 11.
Figure 11:
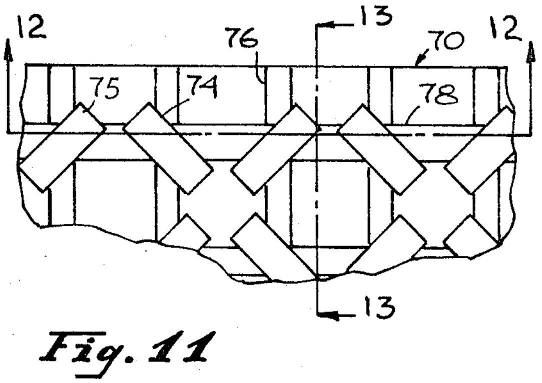
FIG. 11 is a plan view of a mold formed, as by electroforming, from the plate of FIGS. 8–10.
Figure 13:
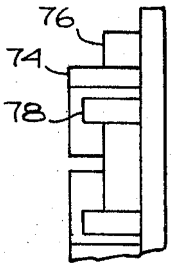
FIG. 13 is a sectional view taken substantially along the plane 13—13 of FIG. 11.

Attention is now called to FIGS. 11 through 13 which illustrate a mold formed from and comprising a negative of the aperture plate 40. Thus, where the aperture plate 40 contained slots 36 and 38 (FIG. 9), the mold 70 of FIGS. 11–13 has projecting teeth 74 and 75. Similarly, the channels 42 in the aperture plate 40 form corresponding rectangular protuberances 76. The row channels 44 in aperture plate 40 form corresponding rectangular protuberances 78. Thus, the mold 70 of FIGS. 11–13 can be subsequently employed to form plastic directly into the aperture plate 40 by a folding procedure similar to that described in conjunction with FIG. 1. An aperture plate formed from the mold 70 would of course have the orthogonal channels already formed therein and would not require that these be machined. Consequently, such aperture plates can be fabricated at a very low cost.

Prior to considering some specific applications of the aperture plate 40, it is pointed out that the plate can be used with cores of virtually any size and is particularly valuable for handling very small cores, e.g. cores having a 30 mil or less outer diameter. Such cores typically have a thickness of 7–8.3 mils. In order to precisely hold the cores within the aperture plate slots, the slots should have dimensions very slightly larger than the core dimensions. Thus, the cross-sectional dimensions of a slot intended to hold 30 mil cores can be approximately 33 mils by 10 mils.

Figure 14:
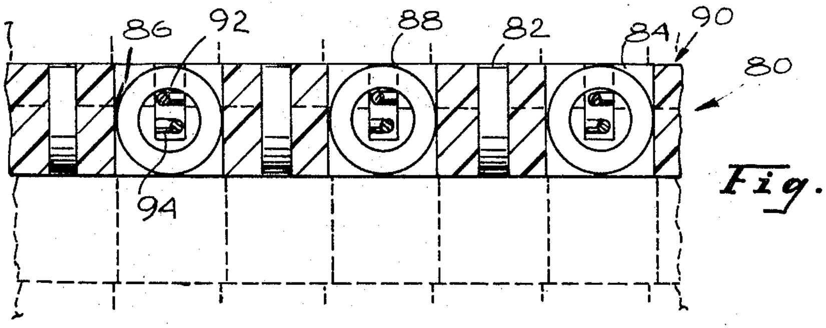
FIG. 14 is a sectional view illustrating a stack of aperture plates, each formed from the mold of FIGS. 11–13.

FIG. 14 shows in cross-section an aperture plate 80 which can be formed from the mold 70 of FIGS. 11–13. The aperture plate 80 has a thickness slightly greater than the outer diameter of the cores. Thus, the cores can be fully received within the slots 82 extending through the plate 80. As previously noted, a support plate (not shown) can be positioned below the aperture plate 80 to prevent the cores 84 from falling through the slots 82. The support plate will preferably have holes formed therein, each aligned with one of the slots in the aperture plate 80 to permit a vacuum to be formed in the slots for facilitating the depositing of the cores therein. Row channels 86 and column channels 88 project into the aperture plate 80 from the top surface 90 thereof. As previously noted, the channels 86 and 88 preferably extend to different depths, each however terminating in alignment with the aperture in the cores. By extending to different depths, a conductor 92 supported on the bottom of a channel 86 will cross over a conductor 94 supported on the bottom of a channel 88. As is also shown in FIG. 14, a plurality of aperture plates 80, each carrying a core matrix, can be placed on top of one another to form a core stack in which the aperture plates actually form part of the ultimate core structure. In order to prevent cores from falling through the slots from one plate to another, adjacent aperture plates can be rotated relative to one another by 90° so that the slots in adjacent plates cross one another. A stack so formed will provide vertical passageways up through it at each of the slot positions permitting a vacuum created on the underside of the bottom plate in the stack to be effective all the way through the stack. Where the aperture plates are to form part of the ultimate stack structure, the channels for receiving the row and column conductors can be formed on opposite surfaces of the aperture plate if desired.

The aperture plate 80 of FIG. 14 functions admirably for most size cores. However, when exceedingly small cores are being handled, they sometimes tend to get stuck in the channels 86 and 88 is the top surface 90 of the plate 80, rather than falling into the slots 84. In order to delete the channels from the top surface 90, the embodiment of FIGS. 15 and 16 is provided.

Figure 16:
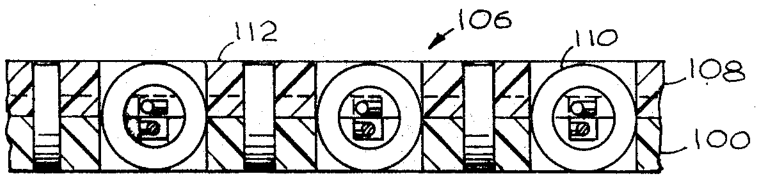
FIG. 16 is a sectional view illustrating an aperture plate employing the half plate shown in FIG. 15.
Figure 15:
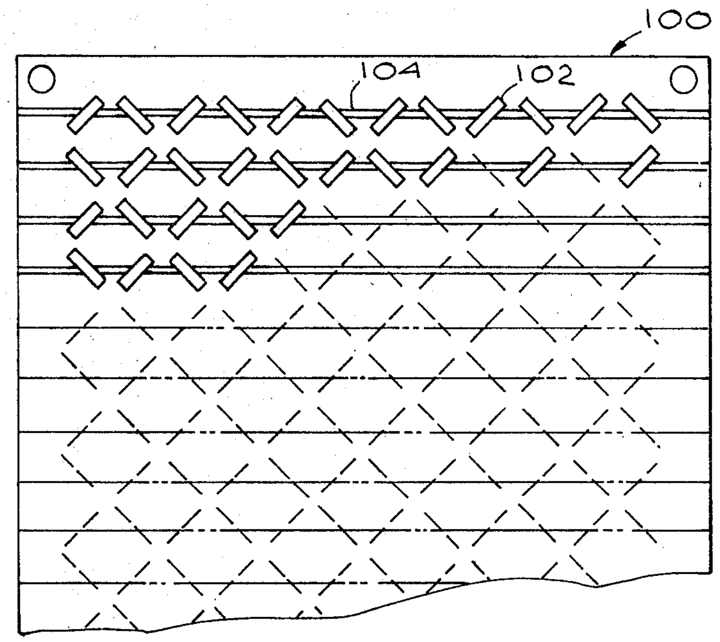
FIG. 15 is a plan view illustrating one-half of an alternate form of aperture plate.

In the embodiment of FIGS. 15 and 16, first and second aperture plate halves are provided and laminated together so that the channels are defined at the interface between the halves. More particularly, FIG. 15 illustrates an aperture plate half 100 which has a matrix of slots 102 formed therein substantially identical to the matrices of the aperture plates aforedescribed. A plurality of parallel channels 104 extends into the aperture plate half 100 from the top surface thereof. The channels 104 on the aperture plate half 100 all extend in the same direction, rather than orthogonally to each other. In order to form a complete aperture plate 106 as shown in FIG. 16, two identical aperture plate halves as shown in FIG. 15 are utilized. That is, an aperture plate half 108 which is identical to the aperture plate half 100, but inverted and rotated by 90°, is superposed thereon. The slots 102 of aperture plate halves 108 and 100 are aligned with one another and can thus receive cores 110 therein in the same manner as the aperture plate 80 of FIG. 14. The channels defined in the aperture plate 108 extend perpendicular to the channels defined in the aperture plate 100 thus permitting row and column conductors to be threaded through the matrix of cores. It should be apparent that the aperture plate 106 of FIGS. 15 and 16 is slighty more difficult to fabricate than the aperture plate 80 of FIG. 14 but however it should also be apparent that it provides an upper surface 112 which is free of the conductor channels in which cores can get stuck. It should be appreciated that the aperture plate 106 can be employed in a stack similar to that shown in FIG. 14. It should also be appreciated that the plate halves of FIGS. 15 and 16 can be formed from a mold similar to that shown in FIGS. 11–13.

From the foregoing, it should be appreciated that aperture plates and methods of fabrication thereof have been disclosed herein for facilitating the assembly of magnetic core memories. It is appreciated that modifications of the embodiments of the invention illustrated herein will occur to those skilled in the art and thus it is intended that the appended claims be interpreted to cover those variations falling within the spirit of the invention.

What is claimed is:

1. A magnetic core assembly comprising:

a plurality of plates stacked on one another, each having top and bottom surfaces;

each of said plates defining a plurality of slots therein each having substantially straight side walls extending between the top and bottom surfaces thereof, the plurality of slots in each of said plates being arranged in a matrix or rows and columns with each slot oriented at a substantially 45° angle relative to said rows and columns;

each of said plates having a plurality of column channels formed therein each intersecting all of the slots of a different one of said matrix rows;

each of said plates having a plurality of row channels formed therein each intersecting all of the slots of a different one of said matrix columns;

said plurality of plates being oriented so that the slots of adjacent ones of said plates are not in alignment thus enabling the top surface of one plate to support a core disposed in a slot in the plate thereabove; and a plurality of magnetic cores, each disposed in a different one of said slots.

2. The core assembly of claim 1 wherein said column and row channels extend into said plate to different depths.

3. The core assembly of claim 1 wherein each of said plates is comprised of first and second halves each having top and bottom surfaces;

said first and second halves being superposed with said bottom surface of said first half being in contact with said top surface of said second half; and wherein said row channels are formed in the bottom surface of said first half and said column channels are formed in the top surface of said second half.

4. The core assembly of claim 1 wherein said plates are oriented so that each slot thereof is at least partially aligned with slots in the plates immediately thereabove and below to thus provide passages through the stacked plates for communicating a vacuum.

References Cited

UNITED STATES PATENTS

| | | | |
|---|---|---|---|
| 3,381,357 | 5/1968 | Billingsley et al. | 29—203 |
| 3,294,393 | 12/1966 | Pilsetnieks | 269—305 |
| 3,214,273 | 10/1965 | Frantzen | 96—36 |
| 3,184,719 | 5/1965 | Perkins | 340—174 |
| 3,176,277 | 3/1965 | Weisz et al. | 340—174 |
| 3,174,837 | 3/1965 | Mears | 29—191 |
| 3,108,364 | 10/1963 | Winn | 29—241 |
| 2,934,748 | 4/1960 | Steimen | 340—174 |

JAMES W. MOFFITT, Primary Examiner

U.S. Cl. X.R.

29—604